US012764782B2

(12) United States Patent
Coffey et al.

(10) Patent No.: US 12,764,782 B2
(45) Date of Patent: Oct. 13, 2026

(54) ACCESS POINT APPARATUS, STATION APPARATUS AND WIRELESS COMMUNICATION SYSTEM HAVING RELIABLE NETWORK MEDIUM ACCESS MECHANISM

(71) Applicant: REALTEK SEMICONDUCTOR CORPORATION, Hsinchu (TW)

(72) Inventors: John Timothy Coffey, San Francisco, CA (US); Der-Zheng Liu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 413 days.

(21) Appl. No.: 18/199,389

(22) Filed: May 19, 2023

(65) Prior Publication Data

US 2024/0267945 A1 Aug. 8, 2024

Related U.S. Application Data

(60) Provisional application No. 63/443,057, filed on Feb. 3, 2023.

(51) Int. Cl.
*H04W 74/06* (2009.01)
*H04W 74/08* (2009.01)

(52) U.S. Cl.
CPC ....... *H04W 74/06* (2013.01); *H04W 74/0875* (2013.01)

(58) Field of Classification Search
CPC .......................... H04W 74/06; H04W 74/0875
USPC .......................................................... 370/329
See application file for complete search history.

(56) References Cited

U.S. PATENT DOCUMENTS 10,271,352 B2 * 4/2019 Coffey .................. H04W 74/06
10,849,060 B2 * 11/2020 Kim ...................... H04W 52/02
11,219,058 B2 * 1/2022 Kwon .................. H04W 74/08
2003/0198244 A1 * 10/2003 Ho ........................ H04W 74/06 370/442
2011/0225121 A1 * 9/2011 Cooper ................. G06F 16/273 707/634
2011/0268054 A1 * 11/2011 Abraham ............. H04W 74/06 370/329
2013/0114622 A1 * 5/2013 Veyseh ............... H04L 12/6418 370/445
2013/0294360 A1 11/2013 Yang et al.
2015/0009879 A1 * 1/2015 Kim .................... H04W 74/002 370/311

(Continued)

OTHER PUBLICATIONS

OA letter of a counterpart TW application (appl. No. 113100500) mailed on Dec. 9, 2024.

*Primary Examiner* — Stephen J Clawson
(74) *Attorney, Agent, or Firm* — WPAT, PC

(57) ABSTRACT

The present disclosure discloses a wireless communication system having reliable network medium access mechanism that includes a station apparatus and an access point apparatus. The station apparatus is arranged to transmit a stub signal for signaling a data transmission to be performed, wherein the stub signal does not include information of the data transmission. The access point apparatus is arranged to receive the stub signal and transmit a transmission polling signal for signaling a permitted time period so as to permit the station apparatus to perform the data transmission in the permitted time period.

18 Claims, 4 Drawing Sheets

(56) References Cited

U.S. PATENT DOCUMENTS

| | | | | |
|---|---|---|---|---|
| 2015/0173075 | A1* | 6/2015 | Choi | H04W 72/30 370/312 |
| 2015/0288427 | A1 | 10/2015 | Wang et al. | |
| 2015/0334592 | A1* | 11/2015 | Choi | H04W 4/70 370/311 |
| 2022/0322424 | A1* | 10/2022 | Shi | H04W 74/0838 |
| 2023/0007684 | A1* | 1/2023 | Guo | H04W 16/14 |
| 2024/0365374 | A1* | 10/2024 | Patil | H04W 74/0816 |
| 2025/0016824 | A1* | 1/2025 | Van Wageningen | H04B 10/116 |

* cited by examiner

ACCESS POINT APPARATUS, STATION APPARATUS AND WIRELESS COMMUNICATION SYSTEM HAVING RELIABLE NETWORK MEDIUM ACCESS MECHANISM

BACKGROUND OF THE INVENTION

1. Field of the Invention

The present disclosure relates to an access point apparatus, a station apparatus and a wireless communication system having reliable network medium access mechanism.

2. Description of Related Art

In a wireless communication system defined by such as, but not limited to the IEEE 802.11 protocol, an access point (AP) and multiple stations (STA) associated with the AP form a basic service set (BSS). Communications occur via transmission of packets over the wireless medium. A fundamental aspect of the operation of the IEEE 802.11 protocol is that packets include a signaled duration, and that all devices that receive that packet will defer from attempting to access the wireless medium for the signaled duration, if the received power level is sufficiently high.

However, such a mechanism has some disadvantages growing in significance as the number and variety of devices presented in the wireless communication system increases. For example, the transmitted packet is likely to be subject to significant interference, in many cases resulting in unsuccessful transmission, if any other stations transmit in the same general area, to the same access point or to some other, while the initial transmission is in progress. In order to have the duration field decoded successfully by all stations in the region that might transmit, the extra transmit power is required.

Further, if the transmit power is not enough, the stations other than the initial transmitting station may misdecode the preamble and intended duration, or alternatively discard the received packet as of too low a received power considering the protocol's rules concerning 'spatial reuse', causing subsequent data transmission in the wireless communication system performed at wrong timings. Deployments with many stations and multiple access points may therefore drift out of synchronization.

For these reasons and others, the current protocol's model of a signaled packet duration that is independently decoded by each candidate-transmitting station in the vicinity has significant disadvantages.

SUMMARY OF THE INVENTION

In consideration of the problem of the prior art, an object of the present disclosure is to provide an access point apparatus, a station apparatus and a wireless communication system having reliable network medium access mechanism.

The present disclosure discloses an access point apparatus used in a wireless communication system having reliable network medium access mechanism that includes a communication circuit and a processing circuit. The processing circuit is coupled to the communication circuit to perform signal transmission and signal receiving therethrough and is arranged to receive a stub signal from a station apparatus in the wireless communication system for signaling a data transmission to be performed thereof, wherein the stub signal does not include information of the data transmission and transmit a transmission polling signal for signaling a permitted time period so as to permit the station apparatus to perform the data transmission in the permitted time period.

The present disclosure also discloses a station apparatus used in a wireless communication system having reliable network medium access mechanism that includes a communication circuit and a processing circuit. The processing circuit is coupled to the communication circuit to perform signal transmission and signal receiving therethrough and is arranged to transmit a stub signal for signaling a data transmission to be performed to an access point apparatus in the wireless communication system, wherein the stub signal does not include information of the data transmission, receive a transmission polling signal for signaling a permitted time period from the access point apparatus and perform the data transmission in the permitted time period.

The present disclosure further discloses a wireless communication system having reliable network medium access mechanism that includes a station apparatus and an access point apparatus. The station apparatus is arranged to transmit a stub signal for signaling a data transmission to be performed, wherein the stub signal does not include information of the data transmission. The access point apparatus is arranged to receive the stub signal and transmit a transmission polling signal for signaling a permitted time period so as to permit the station apparatus to perform the data transmission in the permitted time period.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide an access point apparatus, a station apparatus and a wireless communication system having reliable network medium access mechanism to use the access point apparatus to perform regulation of the access of the wireless medium based on the stub signal transmitted by the station apparatus that attempts to perform data transmission such that not only the power dissipation of the station apparatus is greatly reduced due to the absence of duration signaling, but also the occurrence of the collision among different station apparatuses is reduced.

Figure 1A:
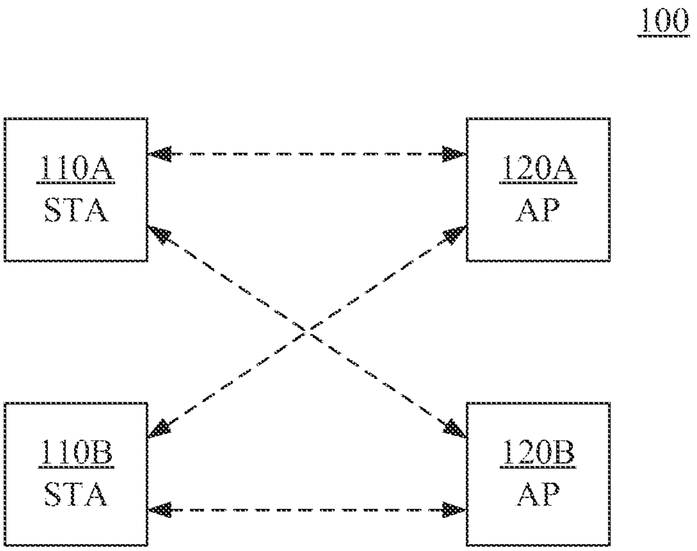
FIG. 1A illustrates a block diagram of a wireless communication system having reliable network medium access mechanism according to an embodiment of the present invention.

Reference is now made to FIG. 1A. FIG. 1A illustrates a block diagram of a wireless communication system 100 having reliable network medium access mechanism according to an embodiment of the present invention.

In an embodiment, the wireless communication system 100 is a wireless local area networking systems based on the IEEE 802.11 standard. However, the present invention is not limited thereto.

The wireless communication system 100 includes a station apparatus 110A, a station apparatus 110B, an access point apparatus 120A and an access point apparatus 120B. Each of the station apparatus 110A and the station apparatus 110B is abbreviated as STA in the figures. Each of the access point apparatus 120A and the access point apparatus 120B is abbreviated as AP in the figures.

Figure 1B:
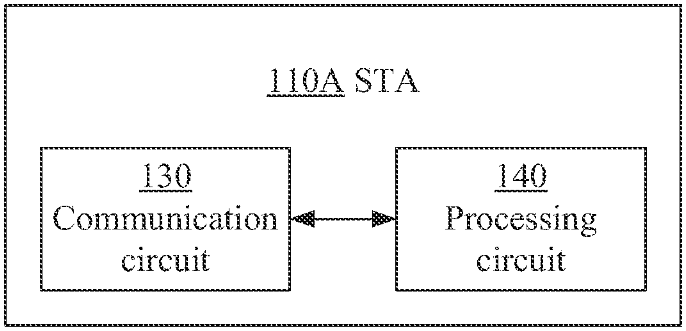
FIG. 1B illustrates a block diagram of the station apparatus according to an embodiment of the present invention.

Reference is now made to FIG. 1B. FIG. 1B illustrates a block diagram of the station apparatus 110A according to an embodiment of the present invention.

In an embodiment, the station apparatus 110A includes a communication circuit 130 and a processing circuit 140. The processing circuit 140 is coupled to the communication circuit 130 to perform signal transmission and signal receiving therethrough, in which the communication circuit 130 performs communication based on the protocol of the wireless communication system 100.

In the following description, the operations of the station apparatus 110A are performed by the processing circuit 140 therein. The communications, e.g., signal transmission and signal receiving, performed by the station apparatus 110A are performed by the processing circuit 140 by using the communication circuit 130.

It is appreciated that the station apparatus 110A may include other circuits so as to operate accordingly. The present invention is not limited thereto. The station apparatus 110B may include components identical to those of the station apparatus 110A. The detail is not described herein.

Figure 1C:
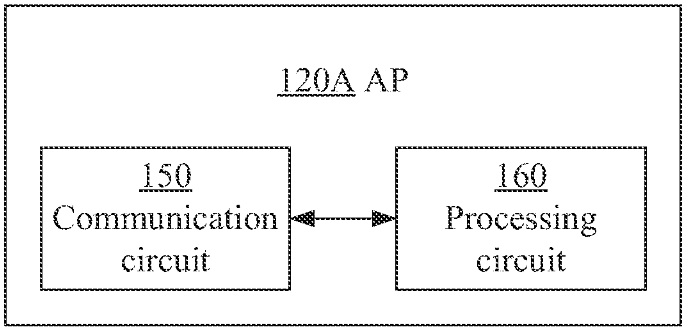
FIG. 1C illustrates a block diagram of the access point apparatus according to an embodiment of the present invention.

Reference is now made to FIG. 1C. FIG. 1C illustrates a block diagram of the access point apparatus 120A according to an embodiment of the present invention.

In an embodiment, the access point apparatus 120A includes a communication circuit 150 and a processing circuit 160. The processing circuit 160 is coupled to the communication circuit 150 to perform signal transmission and signal receiving therethrough, in which the communication circuit 150 performs communication based on the protocol of the wireless communication system 100.

In the following description, the operations of the access point apparatus 120A are performed by the processing circuit 160 therein. The communications, e.g., signal transmission and signal receiving, performed by the access point apparatus 120A are performed by the processing circuit 160 by using the communication circuit 150.

It is appreciated that the access point apparatus 120A may include other circuits so as to operate accordingly. The present invention is not limited thereto. The access point apparatus 120B may include components identical to those of the access point apparatus 120A. The detail is not described herein.

Various usage scenarios are used to describe the operation of the wireless communication system 100 in the following paragraphs in accompany with FIG. 1A and timing diagrams illustrated in FIG. 2 to FIG. 6.

Figure 2:
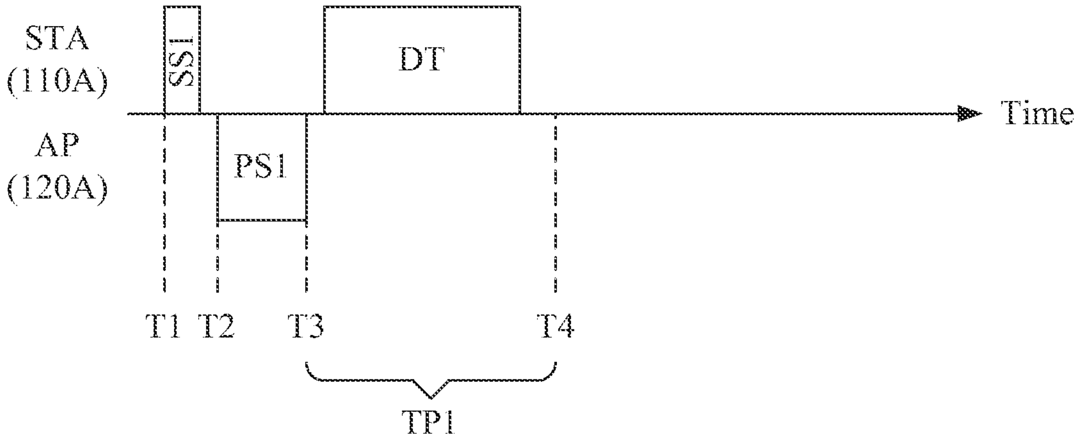
FIG. 2 illustrates a timing diagram of the operation of the wireless communication system in FIG. 1A according to an embodiment of the present invention.

Reference is now made to FIG. 2. FIG. 2 illustrates a timing diagram of the operation of the wireless communication system 100 in FIG. 1A according to an embodiment of the present invention.

In the present embodiment, only the station apparatus 110A attempts to transmit data. The access point apparatus 120A serves as a regulating terminal to regulate the medium access of the wireless communication system 100. In FIG. 2, an axis of time is presented such that the communication initiated by the station apparatus 110A is illustrated above the axis and the communication initiated by the access point apparatus 120A is illustrated below the axis.

At a time point T1, the station apparatus 110A transmits a stub signal SS1 for signaling a data transmission to be performed, wherein the stub signal SS1 does not include information of the data transmission.

More specifically, the stub signal SS1 has no transmission duration signaling, no signaling of the address of both the transmitter (i.e., the station apparatus 110A) and receiver (e.g., the access point apparatus 120A or the access point apparatus 120B), and no data. The stub signal SS1 is a request for access to the medium for transmission of a full packet or multiple packets that include data, in which the full packet is only be transmitted upon receipt of permission.

The access point apparatus 120A receives the stub signal SS1 from the station apparatus 110A. Further, at a time point T2, the access point apparatus 120 transmits a transmission polling signal PS1 for signaling a permitted time period, e.g., the time period TP1 from a time point T3 to a time point T4 in FIG. 2, so as to permit the station apparatus 110A to perform the data transmission, labeled as DT in FIG. 2, in the permitted time period TP1.

The station apparatus 110A receives the transmission polling signal PS1 from the access point apparatus 120A. The station apparatus 110A is further arranged to perform the data transmission in the permitted time period TP1, in which the full packet or multiple packets that include data are transmitted. In different embodiments, either the access point apparatus 120A or the access point apparatus 120B in FIG. 1A can serve as the data transmission target.

Figure 3:
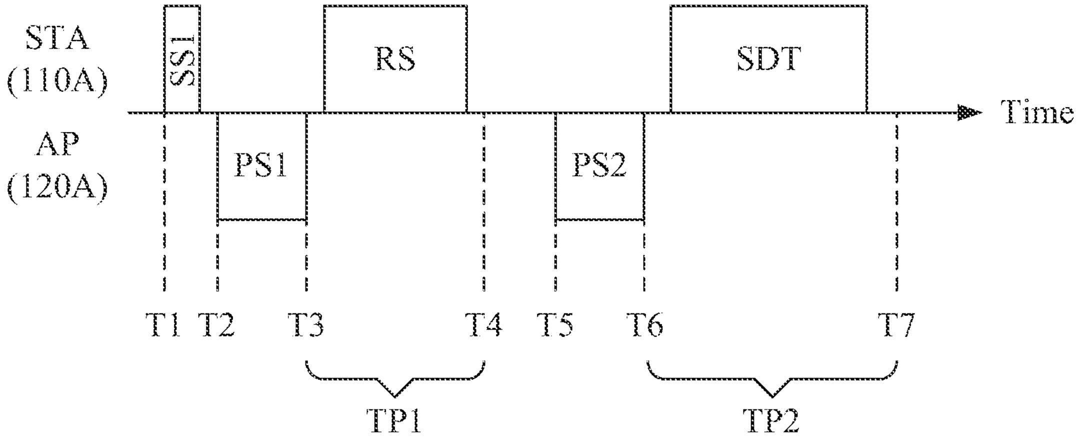
FIG. 3 illustrates a timing diagram of the operation of the wireless communication system in FIG. 1A according to another embodiment of the present invention.

Reference is now made to FIG. 3. FIG. 3 illustrates a timing diagram of the operation of the wireless communication system 100 in FIG. 1A according to another embodiment of the present invention.

In the present embodiment, only the station apparatus 110A attempts to transmit data. The access point apparatus 120A serves as a regulating terminal to regulate the medium access of the wireless communication system 100. In FIG. 3, an axis of time is presented such that the communication initiated by the station apparatus 110A is illustrated above the axis and the communication initiated by the access point apparatus 120A is illustrated below the axis.

At a time point T1, the station apparatus 110A transmits a stub signal SS1 for signaling a data transmission to be performed. The stub signal SS1 is identical to the stub signal SS1 in FIG. 2. As a result, the detail of the stub signal SS1 is not described herein.

The access point apparatus 120A receives the stub signal SS1 from the station apparatus 110A. Further, at a time point T2, the access point apparatus 120A transmits a transmission polling signal PS1 for signaling a permitted time period, e.g., the time period TP1 from a time point T3 to a time point T4 in FIG. 3, so as to permit the station apparatus 110A to perform the data transmission in the permitted time period TP1.

The station apparatus 110A receives the transmission polling signal PS1 from the access point apparatus 120A. However, in the present embodiment, the permitted time period TP1 is not long enough for the station apparatus 110A to transmit the whole data-to-be-transmitted.

As a result, the station apparatus 110A transmits a response signal RS to the access point apparatus 120A in the permitted time period TP1 that includes requested information that requests to perform a subsequent data transmission, wherein the requested information includes at least one of requested data transmission amount, requested transmission duration information, requested priority, requested latency or a data transmission target. In an embodiment, the response signal RS includes identification information, e.g., the device address, such that the station apparatus 110A can be identified accordingly.

The access point apparatus 120A receives the response signal RS from the station apparatus 110A. At a time point T5, the access point apparatus 120A transmits a subsequent transmission polling signal PS2, that identifies the station apparatus 110A based on the response signal RS, for signaling a subsequent permitted time period, e.g., the time period TP2 from a time point T6 to a time point T7 in FIG. 3, according to the requested information so as to permit the station apparatus 110A to perform the subsequent data transmission, labeled as SDT in FIG. 3, with the data transmission target.

The station apparatus 110A receives the subsequent transmission polling signal PS2 from the access point apparatus 120A. The station apparatus 110A performs the subsequent data transmission in the subsequent permitted time period TP2, in which the full packet or multiple packets that include data are transmitted.

It is appreciated that in an embodiment, the station apparatus 110A may transmit first part data of data-to-be-transmitted along with the response signal RS in the permitted time period TP1, and transmit second part data of data-to-be-transmitted in the subsequent permitted time period TP2. In another embodiment, the station apparatus 110A may only transmit the response signal RS in the permitted time period TP1, and transmit whole data of the data-to-be-transmitted in the subsequent permitted time period TP2. In different embodiments, either the access point apparatus 120A or the access point apparatus 120B in FIG. 1A can serve as the data transmission target.

Figure 4:
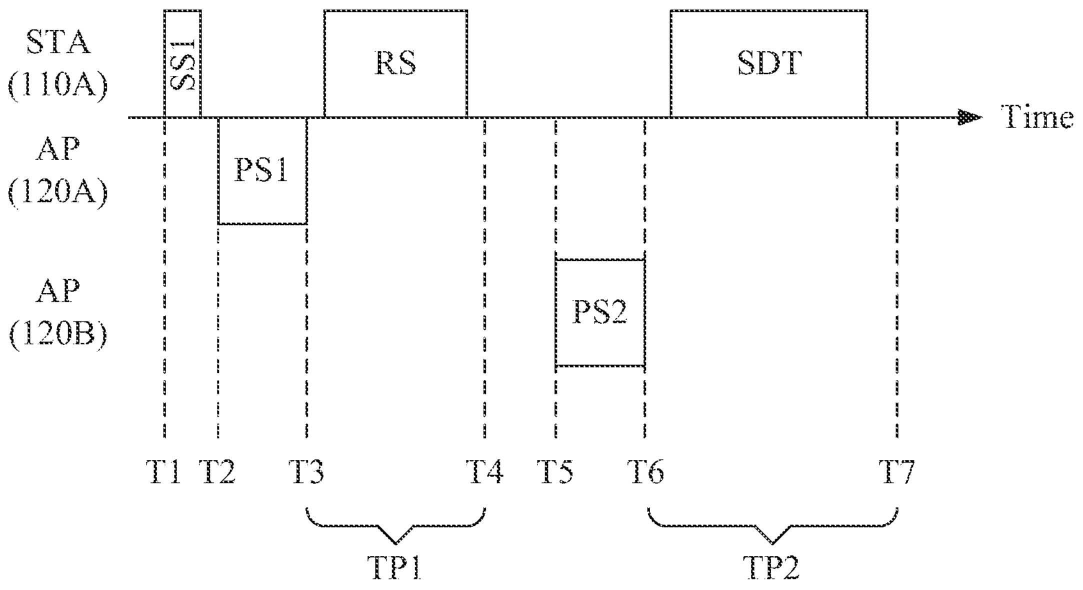
FIG. 4 illustrates a timing diagram of the operation of the wireless communication system in FIG. 1A according to yet another embodiment of the present invention.

Reference is now made to FIG. 4. FIG. 4 illustrates a timing diagram of the operation of the wireless communication system 100 in FIG. 1A according to yet another embodiment of the present invention.

The initial operation of the wireless communication system 100 illustrated in FIG. 4 is similar to that illustrated in FIG. 3, in which the station apparatus 110A transmits the stub signal SS1, the access point apparatus 120A transmits the transmission polling signal PS1 in response to the stub signal SS1 and the station apparatus 110A transmits the response signal RS subsequently. As a result, the detail of these operations is not described herein.

In FIG. 4, the access point apparatus 120B serves as the data transmission target, and the access point apparatus 120B is arranged to receive the response signal RS from the station apparatus 110A and transmit the subsequent transmission polling signal PS2 for signaling the subsequent permitted time period TP2 at the time point T5, such that the station apparatus 110A performs the subsequent data transmission in the subsequent permitted time period TP2.

It is appreciated that when more than one station apparatuses (e.g., the station apparatus 110A and the station apparatus 110B) are in the wireless communication system 100 and attempt to perform data transmission at separate timings, the wireless communication system 100 can operate separately according to the embodiments in FIG. 2 to FIG. 4. However, more than one station apparatuses may occasionally attempt to perform data transmission at the same time and may cause collision. Under such a condition, the wireless communication system 100 may operate according to the embodiments in FIG. 5 and FIG. 6.

Figure 5:
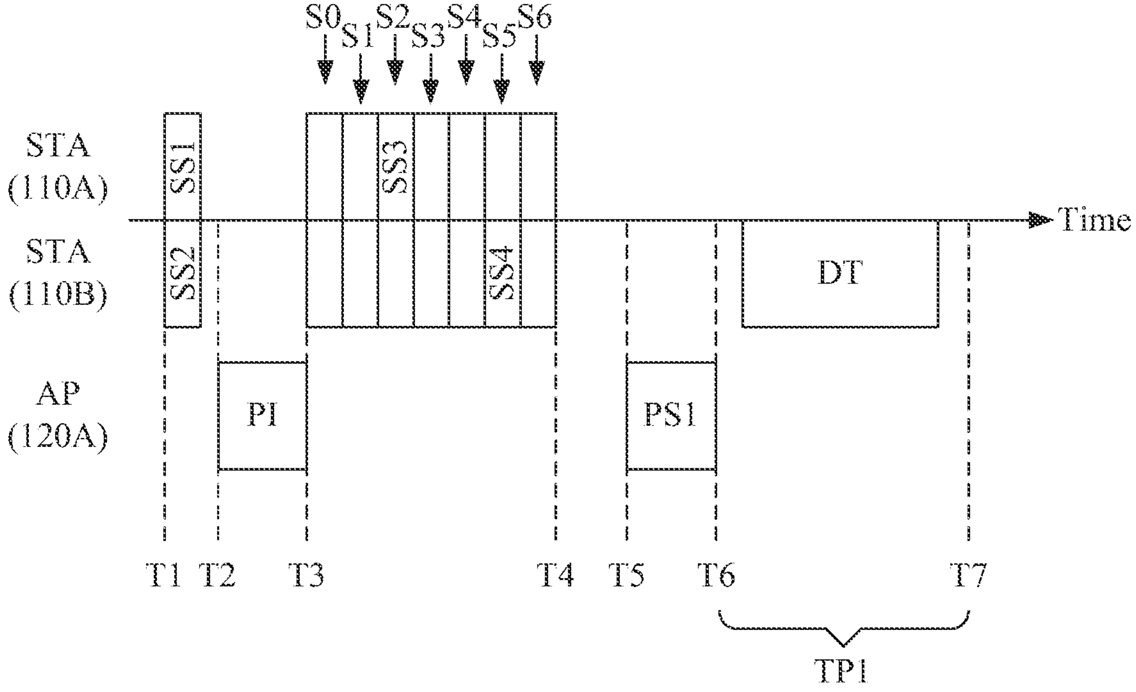
FIG. 5 illustrates a timing diagram of the operation of the wireless communication system in FIG. 1A according to still another embodiment of the present invention.

Reference is now made to FIG. 5. FIG. 5 illustrates a timing diagram of the operation of the wireless communication system 100 in FIG. 1A according to still another embodiment of the present invention.

In the present embodiment, both the station apparatus 110A and the station apparatus 110B attempt to transmit data at the same time. The access point apparatus 120A serves as a regulating terminal to regulate the medium access of the wireless communication system 100. In FIG. 5, an axis of time is presented such that the communication initiated by the station apparatus 110A is illustrated above the axis, the communication initiated by the station apparatus 110B is illustrated below the axis and the communication initiated by the access point apparatus 120A is illustrated further below the communication initiated by the station apparatus 110B.

At a time point T1, the station apparatus 110A transmits a stub signal SS1 for signaling a data transmission to be performed. The station apparatus 110B transmits a stub signal SS2 for signaling a data transmission to be performed. Each of the stub signal SS1 and the stub signal SS2 is identical to the stub signal SS1 in FIG. 2. As a result, the detail of the stub signal SS1 and the stub signal SS2 is not described herein.

The access point apparatus 120A receives the stub signal SS1 from the station apparatus 110A and the stub signal SS2 from the station apparatus 110B. Further, at a time point T2, the access point apparatus 120A transmits an invitation polling signal PI signaling a plurality of time slots S0~S6 ranging from a time point T3 to a time point T4 in response to the stub signal SS1 and the stub signal SS2, to invite the station apparatus 110A and the station apparatus 110B to perform selection among the time slots. The time slots thus serve as a contention window for the station apparatus 110A and the station apparatus 110B.

The access point apparatus 120A determines a designated time slot combination from the time slots S0~S6, wherein the designated time slot combination includes one or more than one of the time slots. In the present embodiment, the designated time slot combination includes only one time slot, e.g., the time slot S5. In addition, the information of designated time slot combination is not included in the invitation polling signal PI which is transmitted to the station apparatus 110A and station apparatus 110B.

Each of the station apparatus 110A and the station apparatus 110B receives the invitation polling signal PI from the access point apparatus 120A. The station apparatus 110A transmits a selection signal corresponding to a desired time slot combination that includes one or more than one of the time slots. In the present embodiment, the selection signal is a subsequent stub signal SS3 subsequent to the invitation polling signal PI.

Likewise, the station apparatus 110B transmits a selection signal corresponding to a desired time slot combination that includes one or more than one of the time slots. In the present embodiment, the selection signal is a subsequent stub signal SS4 subsequent to the invitation polling signal PI.

In the present embodiment, the desired time slot combination includes only one time slot, in which the station apparatus 110A transmits the subsequent stub signal SS3 corresponding to the time slot S2 and the station apparatus 110B transmits the subsequent stub signal SS4 corresponding to the time slot S5.

The access point apparatus 120A receives the subsequent stub signal SS3 from the station apparatus 110A and the subsequent stub signal SS4 from the station apparatus 110B. The access point apparatus 120A determines one of the station apparatus 110A and the station apparatus 110B that transmits the selection signal corresponding to the desired time slot combination matching the designated time slot combination to be a selected station apparatus.

In the present embodiment, the designated time slot combination includes the time slot S5, and the subsequent stub signal SS4 transmitted by the station apparatus 110B corresponds to the time slot S5. As a result, the access point apparatus 120A determines the station apparatus 110B to be the selected station apparatus.

At a time point T5, the access point apparatus 120A transmits a transmission polling signal PS1 for signaling a permitted time period, e.g., the time period TP1 from a time point T6 to a time point T7 in FIG. 5, so as to permit the selected station apparatus 110B to perform the data transmission in the permitted time period TP1.

In an embodiment, the access point apparatus 120A may include information related to the designated time slot combination in the transmission polling signal PS1 to inform the station apparatus 110B being selected. In another embodiment, the selection signals transmitted by the station apparatus 110A and the station apparatus 110B may include identification information, e.g., the device address, thereof. The access point apparatus 120A may include the identification information in the transmission polling signal PS1 to inform the station apparatus 110B being selected.

The station apparatus 110B receives the transmission polling signal PS1 from the access point apparatus 120A. The station apparatus 110B is further arranged to perform the data transmission, labeled as DT in FIG. 5, in the permitted time period TP1, in which the full packet or multiple packets that include data are transmitted. In different embodiments, either the access point apparatus 120A or the access point apparatus 120B can serve as the data transmission target.

On the other hand, since the station apparatus 110A is not the selected station apparatus, the station apparatus 110A defers from attempting to access the wireless medium and may transmit the stub signal again later.

Figure 6:
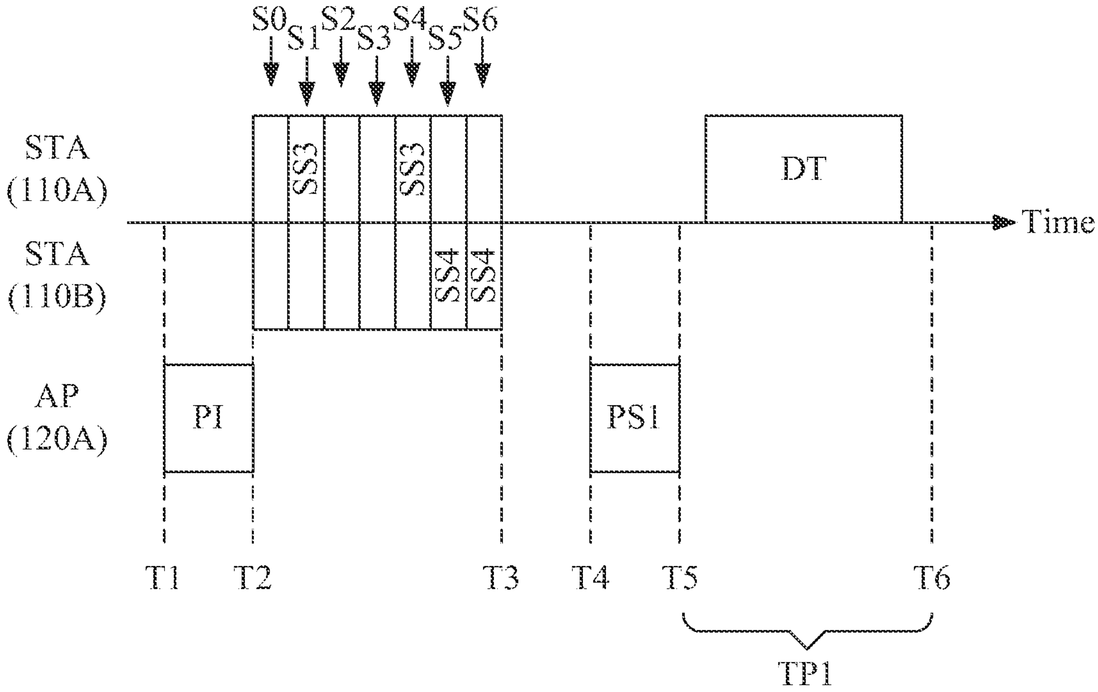
FIG. 6 illustrates a timing diagram of the operation of the wireless communication system in FIG. 1A according to further another embodiment of the present invention.

Reference is now made to FIG. 6. FIG. 6 illustrates a timing diagram of the operation of the wireless communication system 100 in FIG. 1A according to further another embodiment of the present invention.

In the present embodiment, the access point apparatus 120A serves as a regulating terminal to regulate the medium access of the wireless communication system 100. Further, the access point apparatus 120A actively polls the station apparatus 110A and the station apparatus 110B to perform communication. In other words, a communication is not necessarily started with the transmission of the stub signal from either the station apparatus 110A or the station apparatus 110B.

Both the station apparatus 110A and the station apparatus 110B attempt to transmit data at the same time. In FIG. 6, an axis of time is presented such that the communication initiated by the station apparatus 110A is illustrated above the axis, the communication initiated by the station apparatus 110B is illustrated below the axis and the communication initiated by the access point apparatus 120A is illustrated further below the communication initiated by the station apparatus 110B.

At a time point T1, the access point apparatus 120A actively transmits an invitation polling signal PI signaling a plurality of time slots S0~S6 ranging from a time point T2 to a time point T3, to invite the station apparatus 110A and the station apparatus 110B to perform selection among the time slots.

The access point apparatus 120A determines a designated time slot combination from the time slots S0~S6, wherein the designated time slot combination includes one or more than one of the time slots. In the present embodiment, the designated time slot combination includes two time slots, e.g., the time slots S1 and S4.

Each of the station apparatus 110A and the station apparatus 110B receives the invitation polling signal PI from the access point apparatus 120A. The station apparatus 110A transmits a selection signal corresponding to a desired time slot combination that includes one or more than one of the time slots. In the present embodiment, the selection signal is a stub signal SS3 subsequent to the invitation polling signal PI. Likewise, the station apparatus 110B transmits a selection signal corresponding to a desired time slot combination that includes one or more than one of the time slots. In the present embodiment, the selection signal is a subsequent stub signal SS4 subsequent to the invitation polling signal PI.

In the present embodiment, the desired time slot combination includes two time slots, in which the station apparatus 110A transmits the subsequent stub signal SS3 corresponding to the time slots S1 and S4. The station apparatus 110B transmits the subsequent stub signal SS4 corresponding to the time slots S5 and S6.

The access point apparatus 120A receives the stub signal SS3 from the station apparatus 110A and the stub signal SS4 from the station apparatus 110B. The access point apparatus 120A determines one of the station apparatus 110A and the station apparatus 110B that transmits the selection signal corresponding to the desired time slot combination matching the designated time slot combination to be a selected station apparatus.

In the present embodiment, the designated time slot combination includes the time slots S1 and S4 and the subsequent stub signal SS3 transmitted by the station apparatus 110A corresponds to the time slots S1 and S4. As a result, at a time spot T4, the access point apparatus 120A determines the station apparatus 110A to be the selected station apparatus so as to transmit a transmission polling signal PS1 for the station apparatus 110A to perform the data transmission in the permitted time period TP1 ranging from a time spot T5 to a time spot T6. The detail is not further described herein.

On the other hand, since the station apparatus 110B is not the selected station apparatus, the station apparatus 110B defers from attempting to access the wireless medium and may transmit the stub signal again later.

It is appreciated that the embodiments described above are merely an example. Various modifications can be made to operate the wireless communication system 100. Five usage scenarios are further described in the following paragraphs to elaborate the possible modifications.

In a first usage scenario, the access point apparatus 120A may determine a priority time slot specifically for indication of priority besides the designated time slot combination. The station apparatus, either the station apparatus 110A or the station apparatus 110B may further transmit the selection signal not only corresponding to the desired time slot combination, but also corresponding to the priority time slot. The station apparatus that transmits the selection signal corresponding to the priority time slot is able to request a higher priority to perform the data transmission.

For example, in an embodiment, the designated time slot combination determined by the access point apparatus 120A may include only the time slot S1, and the time slot S4 is determined by the access point apparatus 120A for indication of priority. The station apparatus 110A and the station apparatus 110B may both transmit the selection signal corresponding to the time slot S1 as the desired time slot combination, in which the station apparatus 110A further transmits the selection signal corresponding to the priority time slot S4.

Under such a condition, the access point apparatus 120A determines the station apparatus 110A to be the selected station apparatus to perform subsequent operations, e.g., transmitting the transmission polling signal to permit the station apparatus 110A to perform the data transmission in the permitted time period.

In a second usage scenario, when more than one selected station apparatuses are determined, the access point apparatus 120A may actively select one of the selected station apparatuses to perform the data transmission according to a character combination of the identification information of such a station apparatus.

For example, each of the station apparatus 110A and the station apparatus 110B are determined to be the selected station apparatus. The access point apparatus 120A may transmit the transmission polling signal TP1 not only signaling the permitted time period, but also signaling the character combination so as to permit one of the selected station apparatuses having identification information corresponding to the character combination to perform the data transmission in the permitted time period. One of the station apparatus 110A and the station apparatus 110B that has the identification information, e.g., a device address, corresponding to the character combination is identified to perform the data transmission in the permitted time period.

In a third usage scenario, the access point apparatus 120 may transmit a requested polling signal (not illustrated in the figure) that includes requested transmitted power information to request a transmitted power range of the stub signals and/or the subsequent stub signals transmitted by the station apparatus, wherein the requested polling signal is either an independent polling signal or the invitation polling signal.

In a fourth usage scenario, the access point apparatus 120 may adjust a number of the time slots signaled by a future polling signal (not illustrated in the figure) according to the number of the station apparatuses detected according to the stub signals. For example, when the number of the station apparatuses detected is determined to be larger than a predetermine value, the access point apparatus 120 may increase the number of the time slots to avoid the chance of the occurrence of collisions (i.e., different station apparatuses select the same time slot(s)). When the number of the station apparatuses detected is determined to be smaller than a predetermine value, the access point apparatus 120 may decrease the number of the time slots to shorten the contention window so as to speed up the selection process.

In a fifth usage scenario, different from the embodiments that only one access point apparatus, e.g., the access point apparatus 120A serving as the regulating terminal described above, the access point apparatus 120A may cooperate with at least one additional access point apparatus in the wireless communication system 100, e.g., the access point apparatus 120B, to form a joint regulating terminal to receive the stub signal and transmit the transmission polling signal. More specifically, the receiving of the stub signal and the transmission of the transmission polling signal are not necessarily performed by a single access point apparatus and may be performed by separate access point apparatuses in the joint regulating terminal.

In different embodiments, any characteristics that permit the stub signal transmission to be detected easily are suitable for use as part of the format. For example, and without limitation, the short sequence (or short training sequence) of the Clause 17 orthogonal frequency division multiplexing (OFDM) format in the IEEE 802.11-2020 standard can be used. For example, the use of the 8 microsecond OFDM short sequence permits retention of the 9 microsecond slot time structure.

As a result, the station apparatus in the present invention does not need to perform duration signaling, in which the access point apparatus is used to perform regulation of the access of the wireless medium. Not only the high power dissipation that the signaling required under a dense network scenarios can be avoided, but also the occurrence of the collision among different station apparatuses can be reduced.

It is appreciated that the embodiments described above are merely an example. In other embodiments, it should be appreciated that many modifications and changes may be made by those of ordinary skill in the art without departing, from the spirit of the invention.

For example, the number of the access point apparatuses and the number the station apparatuses in the wireless communication system can be any number from one to more than one according to practical requirements. Further, the duration between each neighboring two of the time periods and the signals illustrated in FIG. 2 to FIG. 6 can be different. The present invention is not limited thereto.

In summary, the access point apparatus, the station apparatus and the wireless communication system having reliable network medium access mechanism use the access point apparatus to perform regulation of the access of the wireless medium based on the stub signal transmitted by the station apparatus that attempts to perform data transmission such that not only the power dissipation of the station apparatus is greatly reduced due to the absence of duration signaling, but also the occurrence of the collision among different station apparatuses is reduced.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. An access point apparatus, comprising:

a communication circuit; and a processing circuit coupled to the communication circuit to perform signal transmission and signal receiving therethrough, and the processing circuit arranged to:

receive a stub signal from a station apparatus for signaling a data transmission to be performed thereof, wherein the stub signal does not comprise information of the data transmission, and the information of the data transmission at least comprises addresses of the station apparatus and the access point apparatus;

transmit a transmission polling signal for signaling a permitted time period so as to permit the station apparatus to perform the data transmission in the permitted time period;

receive a response signal from the station apparatus in the permitted time period, wherein the response signal comprises requested information that requests to perform a subsequent data transmission; and transmit a subsequent transmission polling signal, that identifies the station apparatus based on the response signal, for signaling a subsequent permitted time period according to the requested information so as to permit the station apparatus to perform the subsequent data transmission.

2. The access point apparatus of claim 1, wherein the requested information comprises at least one of requested data transmission amount, requested transmission duration information, requested priority, requested latency or a data transmission target.

3. The access point apparatus of claim 1, wherein the processing circuit is further arranged to:

either receive first part data of data-to-be-transmitted along with the response signal and receive second part data of the data-to-be-transmitted in the subsequent permitted time period, or only receive whole data of the data-to-be-transmitted in the subsequent permitted time period.

4. The access point apparatus of claim 1, wherein the processing circuit is further arranged to:

transmit an invitation polling signal signaling a plurality of time slots either in response to or before receiving a plurality of stub signals from a plurality of station apparatuses, to invite the station apparatuses to perform selection among the time slots;

determine a designated time slot combination from the time slots, wherein the designated time slot combination comprises one or more than one of the time slots;

determine one of the station apparatuses that transmits a selection signal corresponding to a desired time slot combination matching the designated time slot combination to be a selected station apparatus, wherein the selection signal either is one of the stub signals received before the invitation polling signal or one of a plurality of subsequent stub signals received after the invitation polling signal; and transmit the transmission polling signal for signaling the permitted time period to identify the selected station apparatus, so as to permit the selected station apparatus to perform the data transmission in the permitted time period.

5. The access point apparatus of claim 4, wherein the processing circuit is further arranged to:

determine more than one of the station apparatuses that transmit the selection signals corresponding to the desired time slot combination matching the designated time slot combination to be a plurality of selected station apparatuses; and transmit the transmission polling signal for signaling the permitted time period and further signaling a character combination so as to permit one of the selected station apparatuses having identification information corresponding to the character combination to perform the data transmission in the permitted time period.

6. The access point apparatus of claim 4, wherein the processing circuit is further arranged to:

transmit a requested polling signal that comprises requested transmitted power information to request a transmitted power range of the stub signals and/or the subsequent stub signals, wherein the requested polling signal is either an independent polling signal or the invitation polling signal.

7. The access point apparatus of claim 4, wherein the processing circuit is further arranged to:

adjusting a number of the time slots signaled by a future polling signal according to the number of the station apparatuses detected according to the stub signals.

8. The access point apparatus of claim 4, wherein the processing circuit is further arranged to:

determine a priority time slot for indication of priority;

determine a plurality of selected station apparatuses each transmitting the selection signal corresponding to the desired time slot combination matching the designated time slot combination; and determine one of the selected station apparatuses that also transmits the selection signal corresponding to the priority time slot; and transmit the transmission polling signal for signaling the permitted time period to identify the one of the selected station apparatus, so as to permit the one of the selected station apparatus to perform the data transmission in the permitted time period.

9. The access point apparatus of claim 1, wherein the access point apparatus cooperates with at least one additional access point apparatus to form a joint regulating terminal to receive the stub signal and transmit the transmission polling signal.

10. A station apparatus, comprising:

a communication circuit; and a processing circuit coupled to the communication circuit to perform signal transmission and signal receiving therethrough, and the processing circuit arranged to:

receive an invitation polling signal signaling a plurality of time slots and transmit a stub signal for signaling a data transmission to be performed to an access point apparatus, wherein the stub signal does not comprise information of the data transmission, and the information of the data transmission at least comprises addresses of the station apparatus and the access point apparatus;

transmit a selection signal corresponding to a desired time slot combination that comprises one or more than one of the time slots;

receive a transmission polling signal for signaling a permitted time period that identifies the station apparatus to be a selected station apparatus from the access point apparatus; and perform the data transmission in the permitted time period.

11. The station apparatus of claim 10, wherein the processing circuit is further arranged to:

transmit a response signal to the access point apparatus in the permitted time period, wherein the response signal comprises requested information that requests to perform a subsequent data transmission, and the requested information comprises at least one of requested data transmission amount, requested transmission duration information, requested priority, requested latency or a data transmission target;

receive a subsequent transmission polling signal, that identifies the station apparatus based on the response signal, for signaling a subsequent permitted time period according to the requested information; and perform the subsequent data transmission to the access point apparatus or the data transmission target.

12. The station apparatus of claim 11, wherein the processing circuit is further arranged to:

either transmit first part data of data-to-be-transmitted along with the response signal and transmit second part data of the data-to-be-transmitted in the subsequent permitted time period, or only transmit whole data of the data-to-be-transmitted in the subsequent permitted time period.

13. The station apparatus of claim 11, wherein the data transmission target is a target access point apparatus that is different from the access point apparatus, and the subsequent transmission polling signal is transmitted by either the access point apparatus or the target access point apparatus.

14. The station apparatus of claim 10, wherein the invitation polling signal is received either before or after transmitting the stub signal and the selection signal either is the stub signal or a subsequent stub signal subsequent to the invitation polling signal.

15. The station apparatus of claim 14, wherein the transmission polling signal further signals a character combination that identification information of the station apparatus corresponds to such that the station apparatus is identified to perform the data transmission in the permitted time period.

16. The station apparatus of claim 14, wherein the processing circuit is further arranged to:

receive a requested polling signal that comprises requested transmitted power information to request a transmitted power range of the stub signals and/or the subsequent stub signals, wherein the requested polling signal is either an independent polling signal or the invitation polling signal.

17. The station apparatus of claim 14, wherein the processing circuit is further arranged to:

transmit the selection signal corresponding to the desired time slot combination and a priority time slot for indication of priority;

receive the transmission polling signal; and perform the data transmission in the permitted time period.

18. A wireless communication system, comprising:

a station apparatus arranged to receive an invitation polling signal signaling a plurality of time slots, transmit a stub signal for signaling a data transmission to be performed and transmit a selection signal corresponding to a desired time slot combination that comprises one or more than one of the time slots, wherein the stub signal does not comprise information of the data transmission, and the information of the data transmission at least comprises addresses of the station apparatus and the access point apparatus; and an access point apparatus arranged to transmit the invitation polling signal to the station apparatus, receive the stub signal and the selection signal from the station apparatus and transmit a transmission polling signal to the station apparatus for signaling a permitted time period that identifies the station apparatus to be a selected station apparatus, so as to permit the station apparatus to perform the data transmission in the permitted time period.

* * * * *